United States Patent [19]
Portas et al.

[11] Patent Number: 6,004,416
[45] Date of Patent: Dec. 21, 1999

[54] SHED-FORMED PROFILE INSULATING COVERING AND MANUFACTURING METHOD THEREOF

[75] Inventors: Francesco Portas, Quattordio; Ubaldo Vallauri, Monza, both of Italy

[73] Assignee: Pirelli Cavi S.p.A., Milan, Italy

[21] Appl. No.: 08/901,349

[22] Filed: Jul. 28, 1997

[30] Foreign Application Priority Data

Jul. 31, 1996 [IT] Italy .................................. MI96A1637

[51] Int. Cl.$^6$ .................................................. B32B 31/00
[52] U.S. Cl. ............... 156/153; 156/244.18; 156/244.19; 264/162; 264/241; 264/272.11
[58] Field of Search .................... 425/167, 172; 264/241, 162, 272.1; 156/242, 244.18, 244.19, 250, 257

[56] References Cited

U.S. PATENT DOCUMENTS

| | | |
|---|---|---|
| 4,128,197 | 12/1978 | Ischenko et al. . |
| 4,670,973 | 6/1987 | Dumont et al. . |
| 4,749,824 | 6/1988 | Orbeck . |

FOREIGN PATENT DOCUMENTS

| | | |
|---|---|---|
| 2046682 | 2/1992 | Canada . |
| 0 071 953 | 2/1983 | European Pat. Off. . |
| 0 120 787 | 10/1984 | European Pat. Off. . |
| 0 683 555 | 11/1995 | European Pat. Off. . |
| 2 363 170 | 3/1978 | France . |
| 2457175 | 12/1980 | France . |
| 2483844 | 12/1981 | France . |
| 2509662 | 1/1983 | France . |
| 2 523 361 | 9/1983 | France . |
| 2541294 | 8/1984 | France . |
| 2 579 005 | 9/1986 | France . |
| 1 762 579 | 1/1958 | Germany . |
| 1 786 449 | 1/1972 | Germany . |
| 5-182546 | 7/1993 | Japan . |
| 6-139860 | 5/1994 | Japan . |
| 640 666 | 1/1984 | Switzerland . |
| 1170752 | 11/1969 | United Kingdom . |

OTHER PUBLICATIONS

International Standard, International Electrotechnical Commission, CEI, IEC, 1109, p. 7 (1992).
Saito et al.; "New Prefabricated Accessories for 66–154 KV Crosslinked Polyethylene Cables" Underground Transmission and Distribution Conference, 1974, pp. 224–232.
Le Peurian et al.; "Synthetic Terminations for High Voltage Cables—Assessment of Service Life" CIGRE' 1992, 21–201, pp. 1–10.
Xidong et al. "Composite Longrod Insulator—The Solution of Future Line Insulation in China" Proceedings Second International Conference on Properties and Applications of Dielectric Materials; vol. 1, Sep. 12–16 1988, pp. 237–240.
Masaomi et al. "Method of Cutting Molded Item of Unvulcanized Rubber", Patent Abstracts of Japan, vol. 007, No. 21 for Japanese Pub. No. 58 114933 (Aug. 7, 1983).

*Primary Examiner*—Donald Loney
*Attorney, Agent, or Firm*—Finnegan, Henderson, Farabow, Garrett & Dunner, L.L.P.

[57] ABSTRACT

Method for manufacturing an insulating body with a predetermined profile for an electrical device. This method comprises the steps of forming a covering body of cross-linkable polymer material on a supporting element, where said body has a first external profile that comprises the envelope of the predetermined profile; to vulcanize the body; and to create the predetermined profile on the external surface of said body by removing portions of said material. The covering body obtained in monolithic vulcanized polymer material comprises a central element and a plurality of frusto-conical sheds formed on it where the internal conical surface of at least one shed forms an angle of less than 80° with the central element and where the external conical surface of at least one shed forms an angle greater than 110° with said central body.

19 Claims, 6 Drawing Sheets

SHED-FORMED PROFILE INSULATING COVERING AND MANUFACTURING METHOD THEREOF

BACKGROUND OF THE INVENTION

This invention refers to insulating or protective coverings, particularly to shed-formed insulating or protective coverings for electrical devices, such as composite insulators, voltage dischargers and terminals for electrical cables, and the manufacturing method thereof.

Outdoor terminals are known, for example, for connecting a cable to an overhead electrical line, usually comprising an insulating covering provided with means for connection to a support pylon, housing within it the terminal portion of a cable whose conductor extends to the extremity of the insulating covering to be connected to the overhead line.

According to the known art, the insulating covering with the function of ensuring insulation between the end portion of the live cable conductor and the earthed supporting structure of the terminal or base consists of an element with a surface extension sufficient to restrain the passage of current along the outer surface of the terminal. This element usually has sheds, according to need, that by increasing the surface area increase the leakage path between the upper end of the terminal and its base so that it can resist surface discharges.

In a known form of embodiment from "New Prefabricated Accessories for 64–154 kV Crosslinked Polyethylene Cables" (Underground Transmission and Distribution Conference, 1974, pages 224–232), an outdoor terminal comprises, in particular, a base plate to which is secured the base of a shed-formed body made of porcelain, to the upper end of which the cable conductor is connected through appropriate means of support and connection; an earth electrode and a field control cone, of polymeric material, is forced onto the cable insulating surface within a cylinder of epoxy resin where it enters the shed-formed body, while the free space within the shed-formed body is filled with insulating oil.

The purpose of said insulating oil within the porcelain covering is to eliminate air, subject to possible ionization where the electrical field is highest, with consequent impairment of the terminal integrity.

The necessity has arisen, e.g. in the covering of high-voltage outdoor terminals for cables with extruded insulation, to replace the porcelain with polymer and composite materials for various reasons, including:

reduce to the minimum the risks of explosion in case of fire or internal electrical discharge;
  reduce the weight;
  reduce the brittleness, so as to prevent damages caused by accidental impacts or, for example, by vandalism;
  increase the simplicity and ease of transport and installation;
  increase the safety margins under conditions of heavy pollution.

The replacement of porcelain in the terminal, as is known for example from CIGRE' 1992, 21–201, entitled "Synthetic Terminations for High Voltage Cables—Assessment of Service Life", is achieved by using tubes (cylindrical and/or conical) of glass-packed resin covered with anti-tracking insulating rubber, which must protect the underlying part against the penetration of moisture and furnish the necessary leakage path (shed-formed profile) to surface current.

Tracking, as defined in IEC standard 1109 of 1992, is an irreversible surface degrading of insulating material with the formation of conductive paths even under dry conditions.

Coverings of anti-tracking insulating rubber are also used, for example,:

in high-voltage outdoor terminals, for cable with extruded insulation, designated "dry terminals" because they are devoid of both the porcelain covering and the insulating oil, such as those described in the article "Extremités synthétiques: vers la très haute tension", by P. Argout, M. Luton, presented at Jicable 1995;
  in self-supporting dry terminals, as for example in European patent application no. 95106910.3;
  in voltage dischargers for medium and high voltage and similar.

For the same reasons glass and porcelain insulators (for supporting the conductors of overhead lines, for example) are also increasingly replaced with so-called "composite insulators", consisting essentially of bars of glass-packed resin which are also covered with anti-tracking insulating rubber with shed-formed profiles.

Some of the types of rubber most commonly used for these anti-tracking coverings with shed-formed profiles are, for example, compounds with an EPR or silicon rubber base.

For the purposes of this description, EPR shall be taken to mean compounds with ethylene-propylene polymer bases, which include in particular the compounds based on EPM (ethylene-propylene copolymer) or EPDM (ethylene-propylene-diene terpolymer).

Various procedures are known for producing these shed-formed rubber coverings and, where required, ensuring their adherence to the element being covered (e.g. a tube of glass-packed resin for the terminals of a cable or a glass-packed resin bar for composite insulators).

One of the most common methods is molding, typically compression molding, as described, for example, in the European patent applications published with number 120, 187 or 71,953, or injection molding, as described in American U.S. Pat. No. 4,670,973 or in Japanese patent application no. 92JP 1763.

The drawbacks of the known techniques for manufacturing shed-formed coverings by molding are caused primarily by the need to use increasingly complex and costly molds as the dimensions of the covering increase and by the production difficulties linked to the increase in molded volume. Other difficulties derive from the need to produce small lots or just prototypes with a given mold. In fact, the mold is an element linked with highly precise shapes and dimensions, and given the complexity of the mold cavities it cannot be easily modified; thus the mold is hardly adaptable to the different needs of the users. The leakage path required for a particular product, for example, varies according to the atmospheric pollution of the area of installation, and this may require the presence of a different number of sheds for a given product and a given profile, hence the need for different molds to produce the number of sheds required. In other cases, the shed profile may vary to satisfy specific user needs, necessitating, as above, the use of a new mold capable of molding the new profile requested.

In addition, as the service voltage increases (60 kV, 90 kV, 150 kV, 245 kV, 400 kV) so the dimensions of the elements to be covered increase and thus the coverings themselves. In the case of high voltage terminals, for example, for voltages of 150 kV the covering diameter is usually between 300 and 350 mm and long around 1500 mm; for voltages of 245 kV, the diameter is usually between 400 and 450 mm, while the length is between 2500 and 3000 mm; for voltages of 400 kV the diameter is usually between 500 and 600 mm and the length between 4000 and 5000 mm.

It is clear that with these dimensions it becomes rather difficult to produce the covering by molding it in a single cycle. The molding should thus be executed in a number of operations, causing further technical problems.

Furthermore, the use of injection-molding technologies limits the selection of polymer material basically to compounds with moderate or low viscosity which can be easily injected into the molds but which often present a compromise regarding the resistance to the tracking effect. From this standpoint, for example, the compounds with liquid silicon rubber bases are the easiest to inject but offer only modest resistance to the tracking effect and particularly high costs.

In cases where compression molding technology is used, it is possible to utilize a broader selection of polymer materials having greater viscosity under molding conditions than the previous types, on the order of 50–70 Mooney at 100° C., for example. Nevertheless, even in this case there are growing difficulties with the size of the mold. In particular, the quantity of material necessary to fill the mold impression must be metered carefully. It is also especially difficult to distribute the material uniformly within the mold impression, given its reduced fluidity, especially when the sheds are large (the pieces may reach 600 mm in diameter). Since the material is unable to adapt to the precise shape of the mold impression, the resulting covering will probably have numerous surface imperfections, which can reduce its resistance to the tracking phenomenon.

Another problem is caused by the residual material left from previous moldings. In fact, the deeper and narrower the mold cavities, the more likely it is that small portions of material will remain attached inside them when the piece is extracted, causing imperfections in the sheds molded thereafter. In particular, it is possible that after a few moldings (four or five) the process must be interrupted to clean the mold impression from accumulated residues, with obvious damage due to the reduced productivity of the machinery.

This is followed by further difficulties in extracting the covering from the mold once it has been vulcanized. Particularly the sheds, and their edges which are is thinner, may stick to the mold, making the extraction operation difficult, in some cases, and even causing it to be torn during the mold opening step, for example. The damage may require the piece to be reworked to repair it, but in some more serious cases the piece may be completely discarded, in some cases along with its support (e.g. the tube or bar of glass-packed resin), greatly increasing production costs.

To obviate some of these problems, therefore, technologies alternative to the molding of monolithic units with shed-formed profiles have been sought. The high costs of the raw material, particularly in the case of silicon rubber, have resulted in a search for processes that could also resolve the problem of minimizing scrap material, which in this highly competitive sector may have a considerable impact on the costs of the finished product.

The French patent application published with no. 2 579 005 describes a process in which initially the individual sheds are molded, then vulcanized and then forced onto a bar of glass-packed resin covered with raw rubber and the entire piece vulcanized in an autoclave. This method, however, though on the one hand it avoids the molding of monolithic units, on the other hand requires the use of a series of molds capable of forming the various sizes of sheds. Then the sheds produced must be forced one by one onto the support, generating gaps between sheds in which anomalous contaminants (such as salts or powders) could deposit, causing concentrated and accelerated electrical erosion.

The Japanese patent published with no. 6139860 calls for the covering to be extruded onto the support and subsequently shaped with sheds by means of suitable blocks that wrap around it while they transmit movement to it. But in this case it is difficult to achieve proper vulcanization without modifying the specified profile. Furthermore it is easy to cause surface irregularities in the area near the various blocks, with the well-known problems they cause and the consequent need to eliminate them with successive operations.

In known alternative techniques, a suitable profile is extruded and wrapped in spiral fashion on its support (tubes or bars of glass-packed resin) previously covered with rubber, and then the assembly is vulcanized, as described, for example, in the French patent published with no. 2,363, 170, in the Canadian patent application published with no. 2,046,682 and in Swiss patent no. 640,666.

Again in this case, however, there are several drawbacks. First, it is not possible to obtain all the types of profiles, some of them particularly advantageous, in a sufficiently practical manner. In particular, one of the profiles best suited for use in highly polluted areas is the one with alternating large- and small-diameter sheds. In this case it would be necessary to extrude a profile with a variable diameter, which is difficult to achieve. In addition, the new profiles, since they are for helical construction, do not ensure the absence of continuous water paths in the presence of rain or heavy humidity, increasing the risk of surface discharges. It is even more complex to ensure precise respect of the angles indicated in the design of these sheds, since during extrusion the raw rubber mixture tend to vary their inclination with respect to the longitudinal axis, due to the effect of gravity, temperature and the time necessary to reach a sufficient degree of reticulation to fix their position. Lastly, the extrusion of helical profiles, with overlapping edges, inevitably generates gaps that must be refinished later to avoid abnormal deposits of contaminants (e.g. salts or powders) that are a cause of concentrated, accelerated electrical erosion.

The French patent application published with no. 2,523, 361 describes another procedure for producing a spirally shed-formed profile. Initially, a layer of polymer is extruded onto a support, then this layer is modeled by passing a spirally wrapped cable onto it, so as to create a spirally shed-formed profile. It is important to note that the removal of material caused by the passage of the cable on the sleeve causes a dangerous effect: in fact, the dragging of the material by the cable could result in a profile that is irregular and thus more exposed to the effects of tracking. Added to this defect are the well-known disadvantages of spiral profiles mentioned above.

SUMMARY OF THE INVENTION

The applicant has discovered that with a different procedure, contrary to the constant teaching of the known technique that seeks to model a shed-formed covering avoiding as much as possible the production of surplus material, certain constraints on the selection of materials are no longer valid. Consequently, other less costly material becomes available, reducing the impact of scrap costs on the finished product. In particular, the applicant was concerned with developing a new procedure that would permit sufficient flexibility in the production of the profiles of the products and which at the same time would provide finished products with a highly uniform, homogeneous surface without excessive additional costs.

Thus, according to a first aspect, this invention regards a procedure for the manufacture of a covering body for an electrical device with a predetermined profile, which comprises the following steps: produce a covering body of cross-linkable polymeric material on a supporting element, said body having a first external profile, comprising the envelope of said predetermined profile; vulcanize said body; create said predetermined profile on the outer surface of said body by removing portions of said material.

Preferably, at least a first part of said removal operation to produce the predetermined profile on the outer surface of the body is performed prior to the vulcanization step. In addition, the first part of said removal operation includes a rough shaping step to create an intermediate outer profile of the body that differs by a predetermined quantity from said predetermined profile. In this way the quantity of excess material not reusable is greatly reduced.

Typically, during the rough shaping step, the amount of material removed is no more than 90% of the total material that needs to be removed to create the predetermined profile of the body, starting from said first outer profile.

In a preferred embodiment according to the present invention, the first part of said removal operation includes a further principal finishing step to produce said predetermined profile starting from said intermediate profile. In this case, the quantity of reusable excess material is further increased, but at the same time it is more susceptible to damaging accidental modifications that cannot be corrected in later steps of processing.

In a further embodiment according to the present invention, the operation of producing said predetermined profile comprises a second removal step, comprising a principal finishing step to produce said predetermined profile starting from said intermediate profile, which is executed after the vulcanization step. Preferably, the is material removed during said finishing step is no more than 30% of the total material that must be removed to create the predetermined profile of the body starting from said intermediate profile. In this way any accidental modifications of the intermediate profile occurring before vulcanization can be corrected in this step, while the predetermined profile, once obtained on the material already reticulated, is sufficiently stable to limit the risks of accidental modifications.

In a preferred form of embodiment, an additional body surface finishing step is performed after the vulcanization step. In that case, the material removed during the surface finishing step is preferably no more than 1% of the total material for finishing the predetermined profile of the body. Then there is a additional step for polishing said body with surface refinished.

In another preferred embodiment according to the present invention, the covering body, including the envelope of said predetermined profile, may be produced by molding, or extrusion, or by winding on said supporting element at least one strip of said cross-linkable polymer, preferably formed by extrusion.

The covering body comprising the envelope of said predetermined profile requires no constraints regarding the roughness of its surface, since it will be refinished afterwards, producing a shed-formed surface free of flashing, gaps and irregularities and thus capable of meeting the most severe service requirements.

The operation of removing material from the covering body is preferably performed by means of cutting or grinding tools or both.

In another aspect, the present invention concerns a monolithic vulcanized polymer covering, comprising a central body on which a plurality of frusto-conical sheds have been created, characterized by the fact that the internal conical surface of at least one shed forms an angle of less than 80° with said central body. Typically the external conical surface of at least one shed forms an angle greater than 110° with said central body.

BRIEF DESCRIPTION OF THE INVENTION

The present invention will be described below, solely as an example, with reference to the annexed figures, as follows.

DETAILED DESCRIPTION OF THE INVENTION

Figure 1:
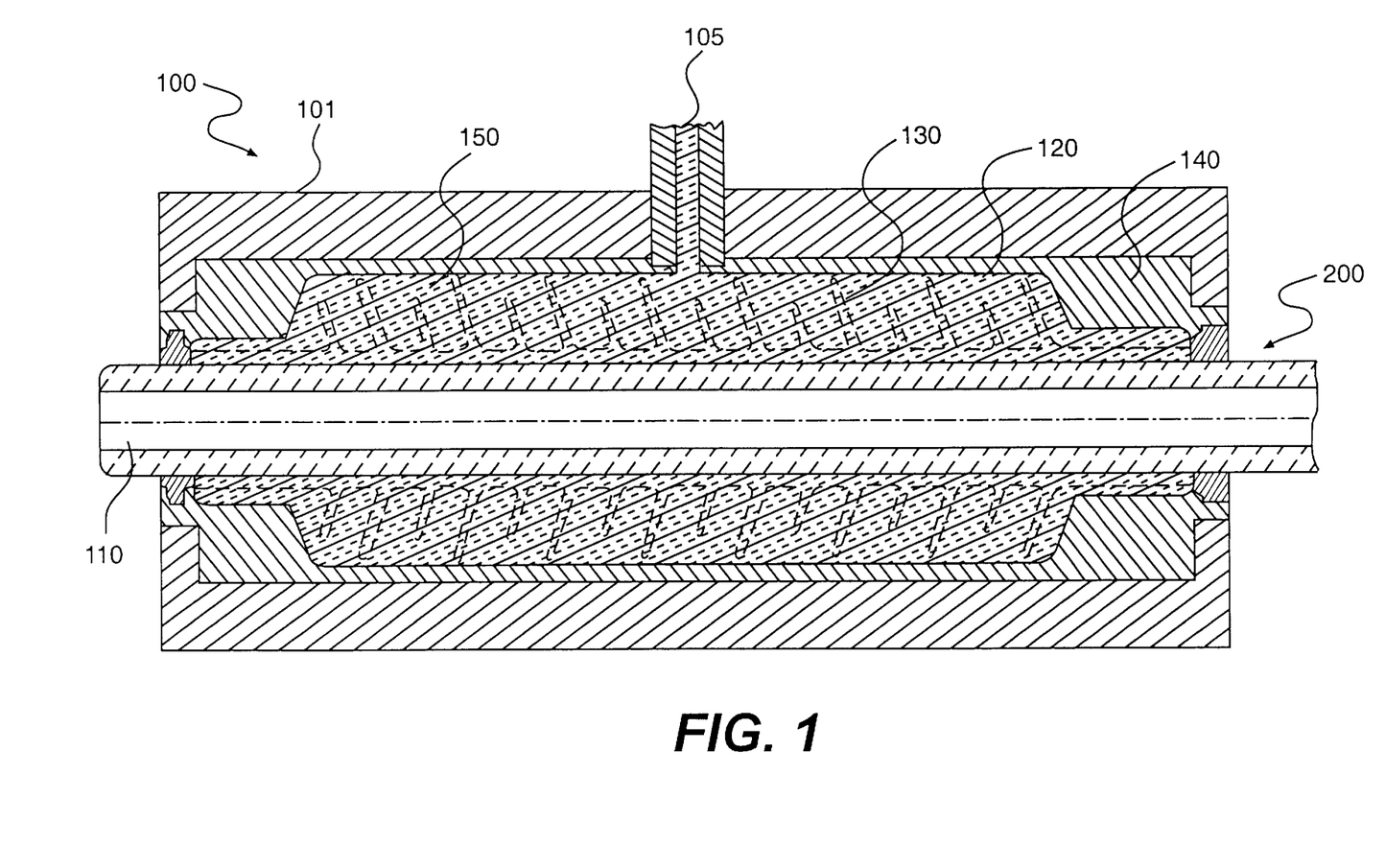
FIG. 1 shows a section view of a mold for molding a monolithic block from which to obtain a shed-formed covering according to one embodiment of the present invention.

FIG. 1 represents a conventional mold 100 which has a nozzle 105 on its outer covering 101, through which cross-linkable polymeric material is fed by injection or directly from the extruder. Inside mold 100 there is also a cylindrical extension 200 for a dry terminal of an electric cable, e.g. a terminal as described in European patent no. 95106910.3 cited earlier. In particular, the figure shows, with dashed lines, the central body 110 of element 200 and, with dashed lines, the shed-formed profile 130 which will assume the polymer covering once the monolithic block has been processed in a successive step. Inside the mold there may be one or more inserts 140 for defining the impression in which shape 120 will be produced. Preferably, inserts 140 may be replaced by modifying the impression of the mold so as to obtain a covering with shape 120 of different dimensions capable of comprising more precisely the covering of the desired shed-formed profile 130, thus reducing the material scrap that is produced successively.

It is important to note that a mold whose purpose is not to produce a shed-formed profile permits the use of essentially linear cavities, i.e. that present a limited number of cavities or irregularities to make the manufacture of the mold easier. This makes it possible to keep mold costs down even as the dimensions of the coverings to be produced increase.

It is clear that, depending on requirements, body 110 of the terminal can be replaced inside the mold with a different cylindrical support on which to mold the covering. In this case, the shed-formed covering will only be forced onto and secured on body 110 in a successive step.

Figure 2:
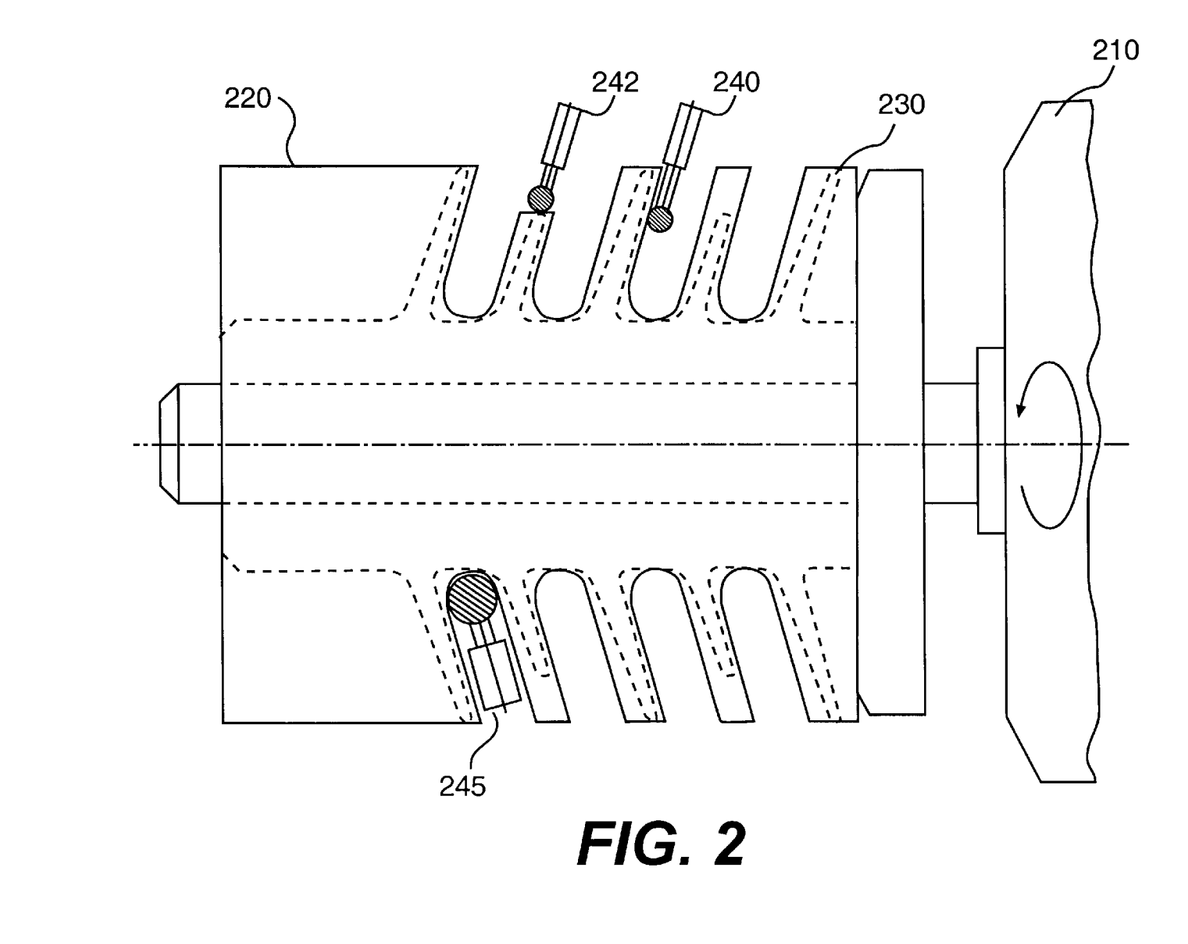
FIG. 2 schematically shows a shed-formed covering mounted on a device for processing by means of abrasive tools.

FIG. 2 schematically represents a mechanical processing device 210, such as a grinding machine, a lathe or similar, on which a monolithic polymer block is mounted with an initial shape comprising the envelope of the predetermined final profile. By means of one or more mills or grinding tools 240, 245, with a spherical head, for example, the initial shape is modified first into an intermediate profile 220 and then into the predetermined final profile 330 of the covering in the predetermined final profile 230 of the covering.

Figure 3:
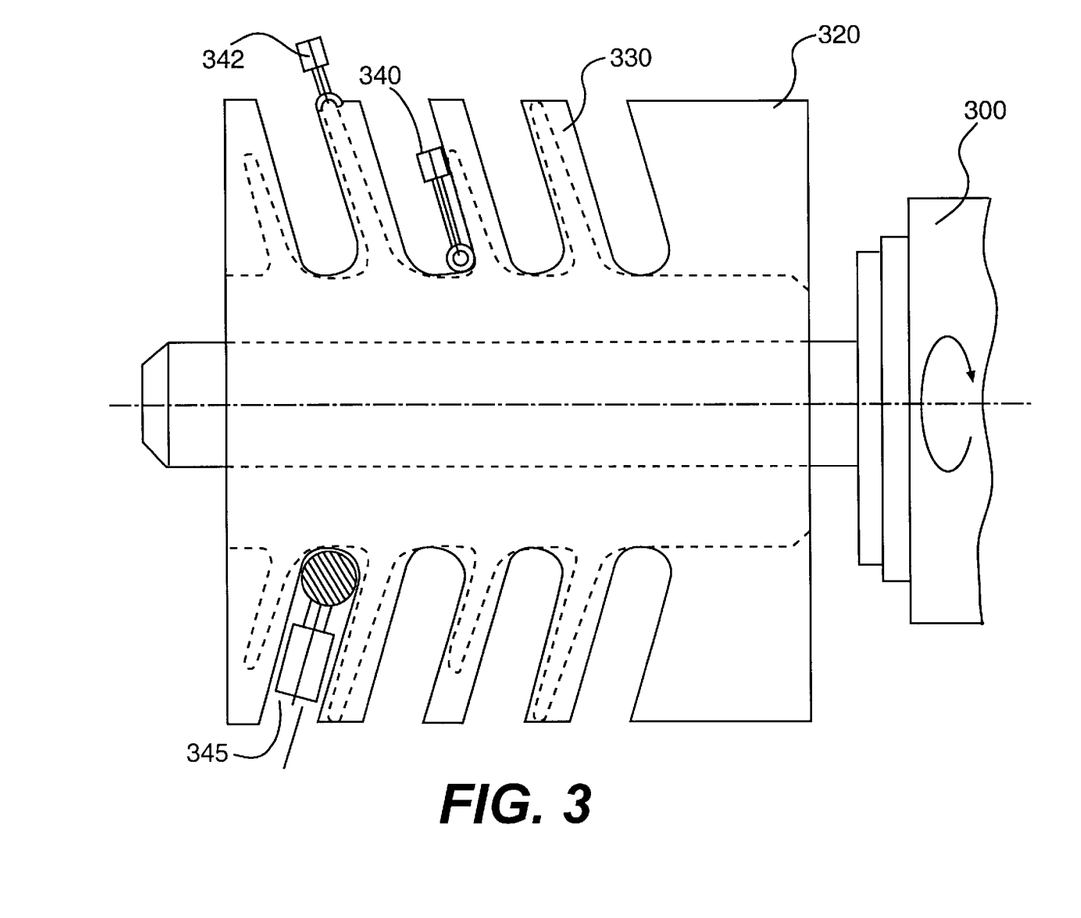
FIG. 3 schematically shows a shed-formed covering mounted on a device for processing by means of cutting tools.

FIG. 3 schematically represents a device 300 similar to preceding device 210, on which a monolithic polymer block with an initial shape that comprises the covering of the predetermined final profile is assembled. By means of one or more suitably shaped cutting tools 340, 342, 345 the initial shape is modified first into an intermediate profile 320 and then into the predetermined final profile 330 of the covering.

Regarding the procedure for manufacturing the shed-formed covering, it consists essentially of two groups of activities: creation of a monolithic block having a shape that comprises the envelope of a final shed-formed profile and the final processing of the monolithic block, preferably mechanical, to create the predetermined final shed-formed profile.

Figure 4:
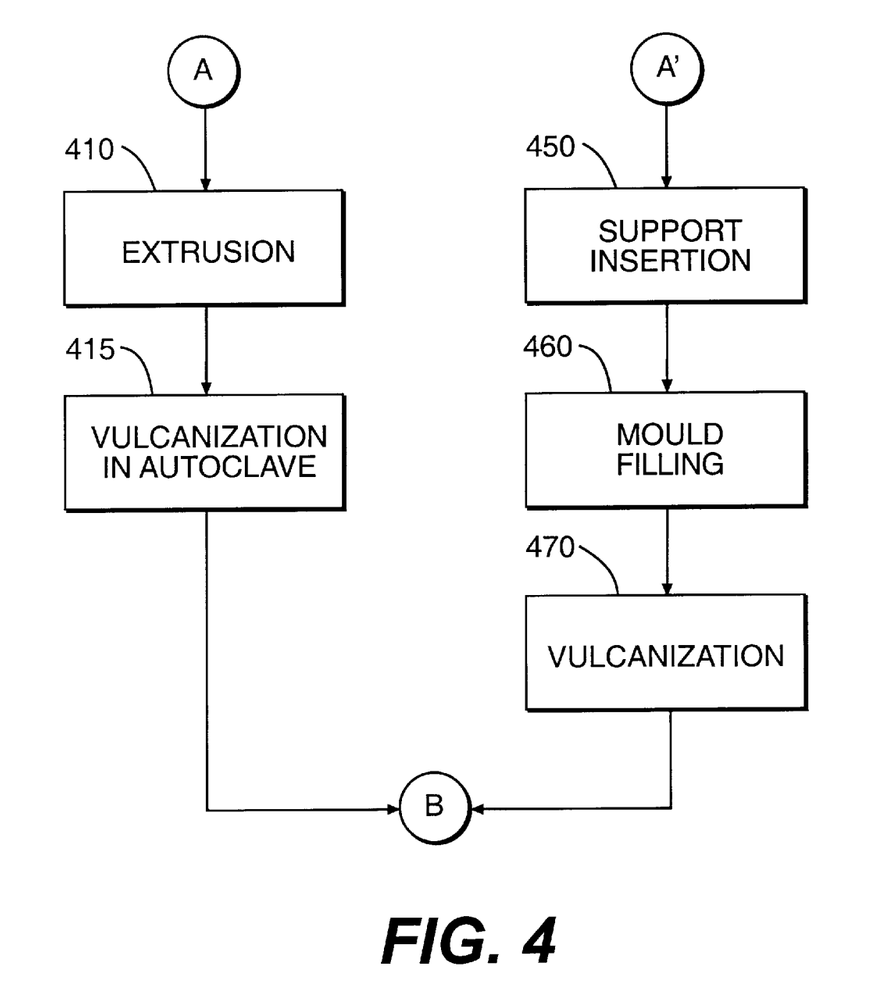
FIG. 4 shows a flow diagram schematically illustrating a method for manufacturing a shed-formed covering according to the present invention.

Those skilled in the art will appreciate that various techniques are available for producing a monolithic block. FIG. 4, for example, represents two possible alternative procedures A and A' in the form of flow diagrams.

Referring to procedure A, initially, at step 410, an extruder suitable fed with cross-linkable anti-tracking polymer material extrudes a monolithic block having a predetermined shape, which comprises the envelope of the final shed-formed profile, preferably on a supporting cylinder or directly on the body of terminal.

Alternatively, at the same step 410, the extruder extrudes one or more strips of cross-linkable anti-tracking polymer material, having a predetermined thickness, that are wrapped in spiral fashion, preferably, onto a supporting cylinder or directly onto a body of a terminal, until it reaches the size of the predetermined shape that comprises the envelope of the final shed-formed profile. The shape thus obtained has various surface imperfections that are not damaging, however, since they will be eliminated during the successive step of mechanical processing B. In both cases it is particularly advantageous to use as the cross-linkable polymer material a compound of EPR, an example of which will be furnished later.

Once the monolithic block extrusion step has been completed, to step 415, the extruded block is vulcanized in an autoclave and again in this step without concern about any surface imperfections. Then the process passes to step B, final processing, described below.

Referring now to procedure A' and to FIG. 1, at step 450 the central body 110 of terminal 200, or a similar cylindrical support, is inserted into mold 100. Then at step 460 the mold is successively fed with cross-linkable anti-tracking polymer material. This material may be introduced into mold 100 through nozzle 105, by injections, for example, or preferably directly from the extruder.

It is important to note that the impression, since it lacks the deep cavities necessary to produce the sheds, as in the case of traditional molds, does not require either a particularly fluid material or a special injector for proper filling of all its volume. So in this case it is possible to avoid the use of complex injection molds and at the same time select compounds more ideal from the standpoint of anti-tracking behavior and cost, without concern for their greater or lesser ease of molding. Under these conditions, during the molding step, as described above, some surface imperfections could appear on the block. These possible defects are not critical, however, since they will be removed during successive step B of block processing to create the shed-formed profile.

Once the filling of mold 100 has been completed so as to obtain a monolithic block with shape 120, said block, at pass 470, is vulcanized inside the mold. Then, after the block is extracted from the mold, it progresses to step B of final processing, described below.

An example of a cross-linkable polymer compound that could be used to produce a monolithic block following either process A or A' could have the following composition, expressed in parts by weight:

| | |
|---|---|
| terpolymer ethylene-propylene-diene based, such as the product in commerce know by the name Durtral TER 4054 of Enichem Elastomeri | 100 |
| zinc oxide | 5 |
| hydrated alumina, finely divided form | 300 |
| trimethoxyvinylsilane | 2 |
| paraffin plasticizer | 30 |
| carbon black NT | 0.3 |
| titanium dioxide, rutile | 20 |
| strearic acid | 3 |
| mercaptobenzothiazole | 1.6 |
| triallyl cyanurate | 1.5 |
| dicumyl peroxide | 7 |

The physical characteristics of the covering produced from this mixture after cross-linking are the following:

| | |
|---|---|
| ultimate tensile stress | 3.5 Mpa |
| percent elongation at ultimate tensile stress | 260% |
| modulus at 100% | 2.2 MPa |
| tracking resistance measured by IEC standard 587 | 3.5 kV |
| residual deformation under forced elongation of 50%, determined by UNI standard 7321-74 on flat specimen at 65° and after 960 hours | 30% |

Figure 5:
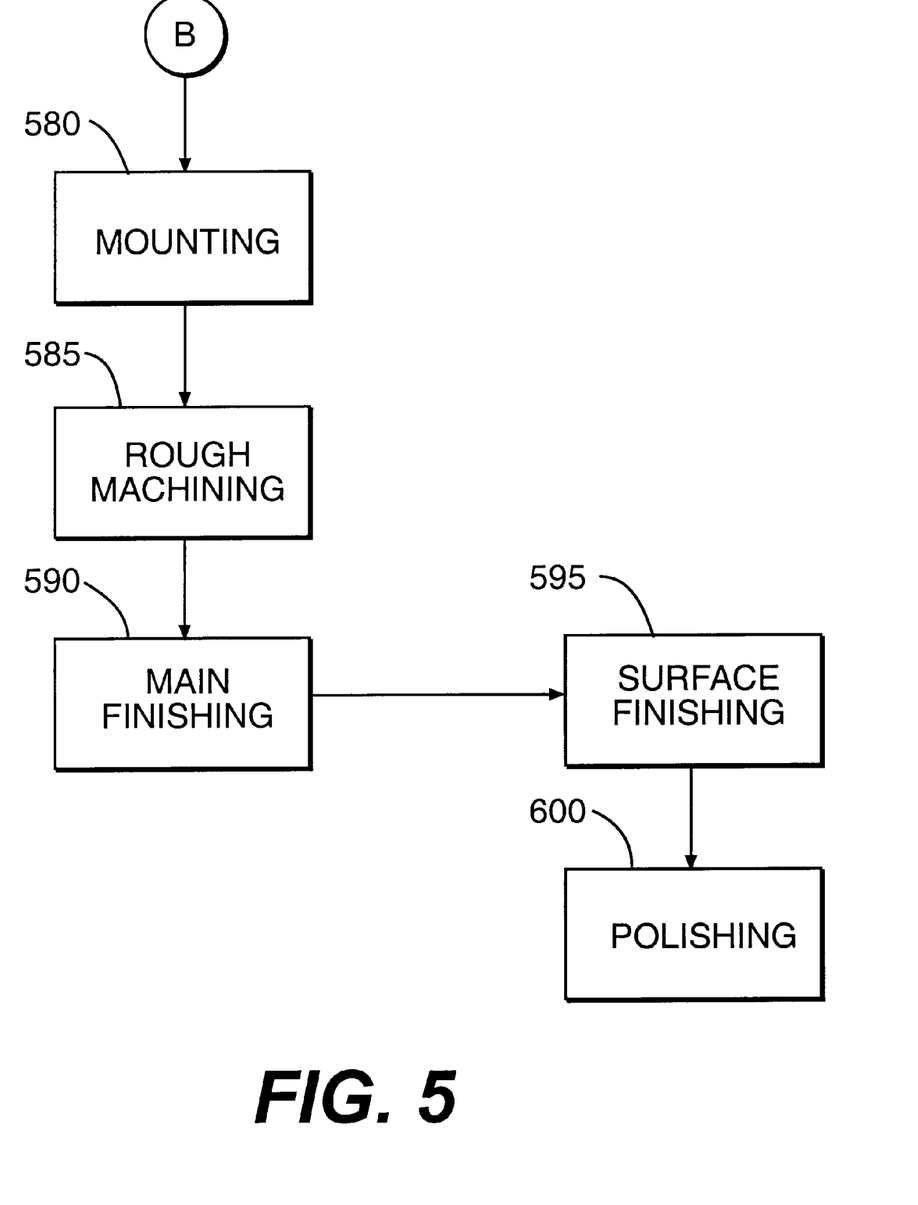
FIG. 5 shows a flow diagram that schematically illustrated the final processing step of the manufacturing method of FIG. 4.

The flow diagram in FIG. 5 describes procedure B of final mechanical processing of the vulcanized monolithic block, obtained either through procedure A or through procedure A'. At step 580, the vulcanized block forced onto terminal 200 or onto the supporting cylinder, is mounted on an instrument for final processing, such as a lathe or a grinding instrument. Then in step 585 the block is rough shaped to bring it closer to the final shed-formed profile. This procedure may be performed with cutting instruments or with abrasive wheels or any other instrument capable of removing portions of material from the block. During this step around 70–90% of the excess material with respect to the predetermined final shed-formed profile is removed. The tools employed are preferably larger than those used in the successive finishing step, either of metallic or ferro-plastic materials.

Step 590 initiates the principal finishing step of the block just rough shaped, with removal of 10–30% of the excess material to obtain a covering with the predetermined final profile. Again in this case either cutting tools or abrasive wheels or any other instrument capable of removing material may be used. With step 590 procedure B may be considered concluded, but it is preferable to perform at least the first of the two steps described below to obtain pieces with better finishes that therefore perform better in service.

This takes us to step 595, where the covering with its shed-formed profile is subjected to surface finishing with instruments such as a fine grain abrasive wheel (e.g. grain 400). Again in this case material is removed that does not exceed 1% of the excess material and thus does not substantially modify the profile obtained through the previous operations. Lastly, the procedure terminates at step 600, where the shed-formed profile undergoes a final polishing, by means of a conventional lapping machine, for example.

The process of removing part of the covering material, necessary to produce the required shed-formed profile, produces large quantities of scrap material. This excess material may make the procedure uneconomical under certain conditions. When producing large quantities of a particularly small shed-formed covering, for example, the cost of scrap material may represent a greater incidence on the depreciation of a small mold for producing that shed-formed profile. The production of small lots of special profiles, on the other hand, as during experimentation, or of large profiles, may prove more economical even when there are large quantities of scrap material solely because it obviates the purchase of costly molds.

Nonetheless, in a preferred embodiment, step 585 of procedure B is performed in advance, being performed in procedure A after the extrusion step (step 410) and before the step of vulcanization in an autoclave (step 415). In this way, once the monolithic block has been produced in step 410, through the winding of an extruded strip of polymer material, for example, the process passes to step 585. In this step the block is rough shaped, with removal of around 90% of the excess material with respect to the predetermined final shed-formed profile, using cutting tools or abrasive wheels. It is important to note that in this case the material is advantageously removed before its cross-linking, which takes place in successive step 415, making it reusable and greatly reducing the quantity of scrap material.

Once step 585 has been completed, the roughed out block is reticulated by vulcanization in an autoclave at step 415, terminating procedure A. When it passes to the final step of mechanical processing, the rough shaped, vulcanized block is mounted, as above, on the final processing instrument at step 580, followed directly by the principal finishing step in step 590, since step 585 (rough shaping) has already been completed. Then procedure B continues as described earlier.

In another preferred embodiment, the sequence of steps 585 and 590 of procedure B are both anticipated, being performed during procedure A after the extrusion step (step 410) and before the vulcanization in autoclave step (step 415). In this way, once the monolithic block has been produced at step 410, by wrapping an extruded strip of polymer material, control passes to step 585. In this step the block is roughed out and around 70–90% of the excess material with respect to the predetermined final shed-formed profile is removed by means of cutting tools or abrasive wheels. Then the principal finishing step is performed in step 590, with removal of around 10–30% of the excess material. It is important to note that in this case the material is advantageously removed before its cross-linking, performed in successive step 415, making it reusable and reducing the quantity of scrap material. Nonetheless, the successive operations of the process are made more critical, since the predetermined profile is not stabilized by vulcanization, which has not yet been performed, so it is more susceptible to accidental modifications that can no longer be corrected in the successive processing steps.

Once step 590 has been completed, the resulting block is reticulated by vulcanization in autoclave at step 415, terminating procedure A. When it passes to the final mechanical processing step, the vulcanized, finished block is mounted, as earlier, on the final processing instrument at step 580, followed directly by the surface finishing step of step 595, since steps 585 and 590 have already been completed. Then procedure B continues as described earlier.

In an example of embodiment as represented in FIG. 2, a shed-formed covering with profile 230 was produced with the following values: length of shed-formed body 89 mm, base of body 13 mm, diameter of central body 23 mm, 5 frusto-conical sheds with maximum diameter of 64 mm, whose internal surface forms an angle of 74° with the surface of the central body.

The monolithic block with initial shape, which includes the envelope of shed-formed profile 230, was produced by employing procedure A' described earlier. This covering is then forced onto the supporting cylinder (diameter 15 mm) of a grinding instrument 210.

The rough shaping work is done with the spherical abrasive tool 245 with grain 100 rotating at around 15,000 rpm, which moves automatically over the monolithic block with initial shape to produce an intermediate profile 220 close to the predetermined final profile 230. The block in turn rotates on its axis at around 280 rpm. Once the rough shaping work is finished, a pair of spherical tools 240 and 242 with grain 200, rotating at 15,000 rpm, performing the principal finishing work to obtain the predetermined profile 230 from the rough shaped block with profile 220, which rotates on its own axis at around 200 rpm.

In another example of embodiment as represented in FIG. 3, a lathe 300 was used to obtain an envelope with a predetermined shed-formed profile 330 starting with a monolithic block with an initial shape that comprises the covering of the predetermined final profile, again produced by means of procedure A'. Then the rough shaping work is done by a spherical tool 345 with grain 100, rotating at around 15,000 rpm, which moves automatically on the monolithic block with initial shape to produce an intermediate profile 320 close to final predetermined profile 330. Once the rough shaping work is completed, a pair of cutting tools 340 and 342, suitably shaped to ensure the required profile 330. To obtain the shaping required, for example, the solid covering is rotated at around 250 rpm.

In both cases, the removal work may be followed by surface finishing with emery cloth, at grain 400 for example, and then polishing, so as to obtain a particularly smooth surface free of imperfections or irregularities that could weaken the anti-tracking effect of the covering.

Figure 6:
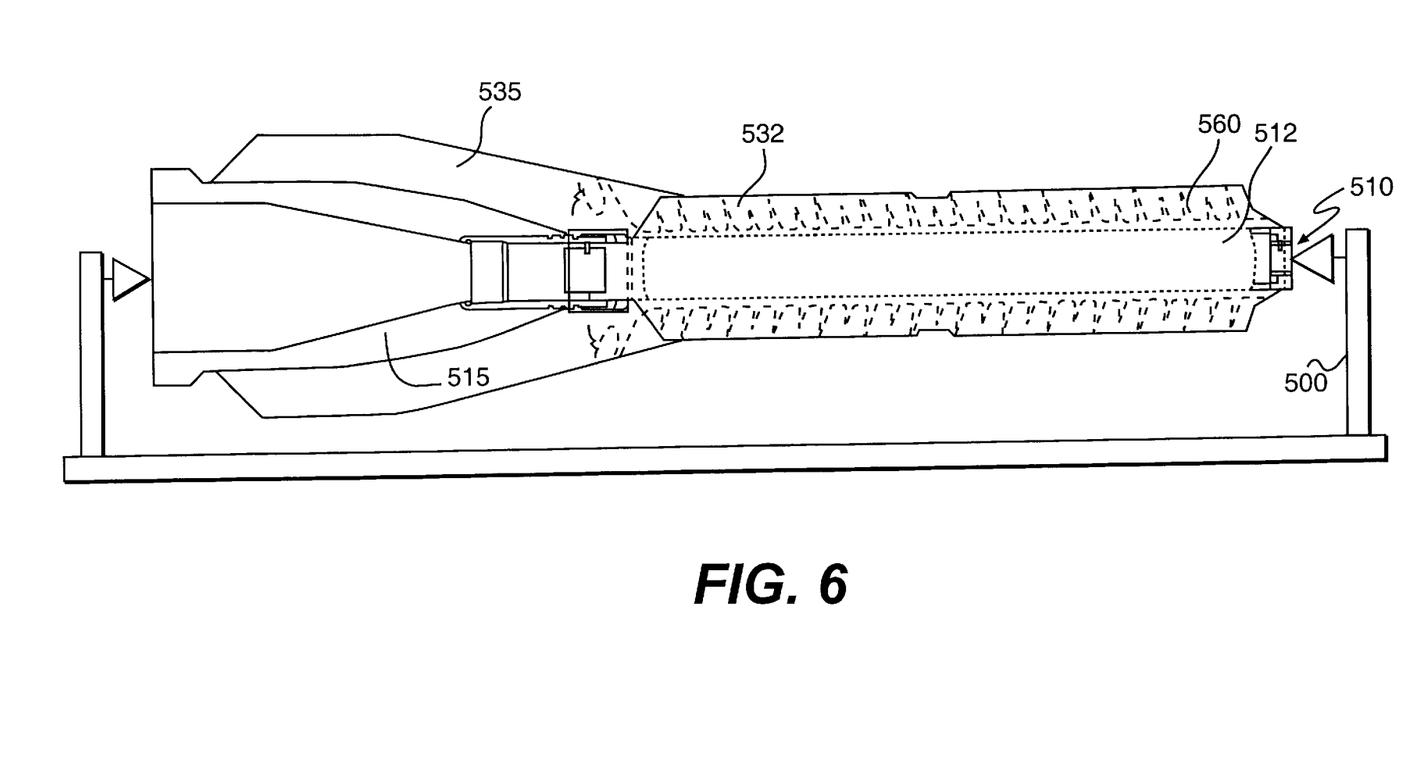
FIG. 6 schematically shows a covering for a 150 kV terminal mounted on an instrument for processing according to another embodiment of the present invention.

FIG. 6 shows an example of an embodiment of a covering for a larger terminal, such as the one described in European patent application no. 95106910.3.

The body 510 of a dry terminal of the 150 kV series, length 2195 mm, is mounted on a lathe 500. Said body 510 was given a solid covering 532, 535 of an EPR compound, with a recipe like the one described earlier for example, both for the cylindrical extension 512 and for the basic body 515 of the terminal, obtaining an element with a maximum radius of 274.5 mm and total weight of around 290 kg. Covering 532 for the cylindrical extension has a volume of 61.5 l and total weight of 90 kg, while covering 535 for the basic body has a volume of 74.3 l and weighs 110 kg. Both coverings, once extruded and wrapped around their respective elements, are vulcanized in autoclave to create a single monolithic body.

By removing pieces of material by means of conventional cutting tools, not shown in the figure, covering 532 is shaped to produce the desired shed-formed profile 560. In the same way, covering 535 is also suitably shaped to realize the desired profile, not shown in the figure, for this portion of the covering.

The present application describes only the case of shed-formed coverings for electrical cable terminals, but those skilled in the art may appreciate that the same concepts may be utilized to produce a shed-formed covering for any other device in which similar requirements are present.

We claim:

1. Method for the manufacture of a covering body with a predetermined profile (130, 230, 330, 560) for an electrical device, said method comprising the following steps:

producing a covering body of cross-linkable polymeric material on a supporting element (200), said body having a first external profile (120, 532, 535), including an envelope of said predetermined profile;

vulcanizing said body;

creating said predetermined profile (130, 230, 330, 560) on the external surface of said body by means of a removal operation of portions of said material.

2. Method according to claim 1, where at least a first part of said removal operation to create the predetermined profile (130, 230, 330, 560) on the external surface of the body is performed before the vulcanization step.

3. Method according to claim 2, where said first part of said removal operation includes a rough shaping step to create an intermediate external profile (220, 320) of the body that differs by a predetermined quantity from said predetermined profile (130, 230, 330, 560).

4. Method according to claim 3, where during the rough shaping step no more than 90% of the total material to be removed to produce the predetermined profile (130, 230, 330, 560) of the body is removed, starting from said first external profile (120, 532, 535).

5. Method according to claim 3, where said first part of said removal operation further comprises a principal finishing step to produce said predetermined profile (130, 230, 330, 560) starting from said intermediate profile (229, 320).

6. Method according to claim 3, said operation to produce said predetermined profile (130, 230, 330, 560) includes a second removal step starting from said intermediate profile (220, 320), which is performed subsequent to the vulcanization step.

7. Method according to claim 5 or 6, where during said finishing step no more than 30% of the total material to be removed to produce said predetermined profile (139, 230, 330, 560) of the body starting from said intermediate profile (220, 320) is removed.

8. Method according to claim 1 where said removal operation to produce the predetermined profile (139, 230, 330, 560) on the external surface of the body is performed subsequent to the vulcanization step.

9. Method according to claim 1 comprising a further step of surface finishing of the body, performed subsequent to the vulcanization step.

10. Method according to claim 9 where during the surface finishing step no more than 1% of the total material for finishing the predetermined profile (139, 230, 330, 560) of the body is removed.

11. Method according to claim 9 comprising a further step of polishing of said surface finished body.

12. Method according to claim 1 where said step to produce a covering body, including the covering of said predetermined profile (139, 230, 330, 560) comprises molding said body.

13. Method according to claim 1 where said step to produce a covering body, including the envelope of said predetermined profile (139, 230, 330, 560), comprises the extrusion of said body.

14. Method according to claim 1 where said step of producing a covering body, comprising the envelope of said predetermined profile (139, 230, 330, 560) comprises the wrapping of said supporting element with at least one strip of said cross-linkable polymer material.

15. Method according to claim 14 where said step of producing a covering body, including the envelope of said predetermined profile (139, 230, 330, 560), comprises the extrusion of at least one strip of said cross-linkable polymer material and the spiral wrapping of said at least one strip on said supporting element.

16. Method according to claim 1, where said operation of removing material from said body is performed by cutting tools (342, 340).

17. Method according to claim 1, where said operation of removing material from said body is performed by grinding tools (345, 245, 242, 240).

18. Method according to claim 1, where said material comprises an EPR-based compound.

19. Method according to claim 1, where said supporting element comprises said electrical device.

* * * * *